United States Patent Office 2,952,565
Patented Sept. 13, 1960

2,952,565

METHOD OF COATING STEEL WITH WATER BASE PROTECTIVE COATING COMPOSITION CONTAINING A VOLATILE NITROGENOUS BASE SALT OF AN INTERPOLYMER OF A CONJUGATED 1,3-DIENE AND ACRYLIC OR METHACRYLIC ACID

Leo L. Contois, Jr., Corpus Christi, Tex., and John B. Ott, Northampton, Mass., assignors to Monsanto Chemical Company, St. Louis, Mo., a corporation of Delaware No Drawing. Filed Feb. 10, 1956, Ser. No. 564,648

7 Claims. (Cl. 117—75)

The present invention relates to water base protective coating compositions and to methods for protecting solid surfaces therewith. More particularly, the present invention relates to protective coating compositions containing a true aqueous solution of a high molecular weight polymer as the pigment binder and the invention further relates to the protective coatings prepared therefrom.

The development of water base protective coating compositions is an object of long standing in the protective coating art. The advantages of depositing a protective coating from compositions employing water as the vehicle are obvious from the viewpoint of both economy and safety. To date, however, the art has not developed satisfactory compositions employing a water-soluble material as the film former and pigment binder. The use of latexes of water-insoluble polymers as pigment binders is widespread, but it is recognized that there are inherent shortcomings in such compositions. The films deposited from a latex consist essentially of individual spheres of the emulsified polymer joined to each other only in so far as the spheres are soft enough to flatten, contact and merge in a sintering effect. Inherently, a compromise must be made between a polymer that is too soft to give a durable film and a polymer that is too hard to give an adhesive and cohesive sintered type continuity. In addition, the sintered ball continuum is an inefficient means for covering a solid surface with a uniformly dense, strongly adherent, pigmented film.

It is an object of this invention to provide novel water base protective coating compositions.

Another object of this invention is to provide a method for depositing protective coatings on solid surfaces from novel water base protective coating compositions.

Other objects and advantages of this invention will become apparent from the following detailed description thereof.

In accordance with this invention there are provided novel water base protective coating compositions and an improved method for depositing protective coatings on solid surfaces from such compositions. In the compositions of this invention a salt formed between a volatile nitrogenous base and an interpolymer consisting essentially of a conjugated diene and an acidic monomer of the group consisting of acrylic acid, methacrylic acid and mixtures thereof is dissolved in water and serves as the film former and pigment binder of the compositions. Protective coatings are prepared by applying the protective coating composition to the surface to be protected and evaporating the water therefrom. The dried film remaining on the surface is a water-insoluble interpolymer of the conjugated diene and the acidic monomer. The protective coatings thus obtained are remarkably hard and flexible and have excellent adhesion to the surfaces to which they are applied. In addition, the protective coatings have excellent resistance to water and a wide variety of organic solvents.

The following examples are set forth to illustrate more clearly the principle and practice of this invention to those skilled in the art. Unless otherwise noted, all parts are by weight.

EXAMPLE I

A butadiene-acrylic acid interpolymer is prepared by dissolving 50 parts butadiene, 50 parts acrylic acid and 2 parts lauroyl peroxide in 320 parts of 1,2-dichloroethane and heating for 44 hours at 50° C. The interpolymer is obtained in a highly swollen state and is dried for 17 hours at 40° C.

Ten parts of the polymer are dissolved in 90 parts of 1% ammonium hydroxide. A film cast from this solution and dried for 0.5 hour at 250° F. is hard and flexible and has good water resistance.

A second protective coating composition is prepared by incorporating 0.02% of a cobalt drier in the coating composition described in the paragraph immediately above. Films cast from this composition will air dry.

EXAMPLE II

Two butadiene-acrylic acid interpolymers are prepared in the aqueous emulsion polymerization systems set forth below:

| Components | Parts | |
|---|---|---|
| | Polymer A | Polymer B |
| Butadiene | 55 | 40 |
| Acrylic Acid | 45 | 60 |
| Potassium Persulfate | 0.3 | 0.3 |
| Emulsifier [1] | 4.5 | 4.5 |
| Dodecyl Mercaptan | 0.5 | 0.5 |
| Water | 350 | 350 |

[1] HCl salt of 1 hydroxyethyl-2-heptadecynyl glyoxalidine

The polymerizations are carried out for 20 hours at 50° C. and the products are obtained as stable latexes. The polymers are recovered by coagulating the latexes with sodium chloride and subsequently washing the polymers with water until all salts are removed.

Protective coating compositions containing, respectively, Polymer A and Polymer B, are prepared by dissolving 10 parts of the polymer in 90 parts of a 1% ammonium hydroxide solution. Films cast therefrom and baked for 0.5 hour at 110° C. are hard and flexible and have excellent water resistance.

EXAMPLE III

An interpolymer consisting of butadiene and acrylic acid is prepared in the emulsion system set forth below:

Component: Parts
- Butadiene _____ 55
- Acrlyic acid _____ 45
- Potassium persulfate _____ 0.3
- Emulsifier A [1] _____ 3.6
- Emulsifier B [2] _____ 1.2
- Dodecyl mercaptan _____ 1.0
- Water _____ 300

[1] Sodium dioctylsulfosuccinate.
[2] Tridecyl ether of tetraethylene glycol.

The polymerization is carried out for 20 hours at 50° C. and the polymer is obtained in the form of a stable latex. The polymer is isolated and evaluated for film forming properties as described in Example II. Comparable results are obtained.

EXAMPLE IV

Example III is repeated except that the emulsifiers of

Example III are replaced with 2.0 parts of sodium dioctylsulfosuccinate and 2.0 parts of the sodium salt of an alkylated aryl polyether sulfonate. The isolation and recovery of the polymer is carried out as described in Example III. Films cast from ammonium hydroxide solutions of the polymer are comparable to those obtained with the products of Examples II and III.

EXAMPLE V

An interpolymer of butadiene and acrylic acid is prepared in an emulsion employing the recipe set forth below:

| Component: | Parts |
| --- | --- |
| Butadiene | 25 |
| Acrylic acid | 75 |
| Potassium persulfate | 0.3 |
| Emulsifier A [1] | 2.5 |
| Emulsifier C [2] | 2.5 |
| Dodecyl mercaptan | 1.2 |
| Water | 250 |

[1] Sodium dioctylsulfonsuccinate.
[2] Sodium salt alkylated aryl polyether sulfonate.

The polymerization is carried out for 48 hours at 50° C. and the product is obtained as a stable latex. The polymer is soluble in dilute ammonium hydroxide and air dried films cast therefrom are resilient and tough.

EXAMPLE VI

A terpolymer of butadiene, methacrylic acid and ethyl methacrylate is prepared in an emulsion employing the recipe set forth below:

| Component: | Parts |
| --- | --- |
| Butadiene | 30 |
| Ethyl methacrylate | 30 |
| Methacrylic acid | 40 |
| Potassium persulfate | 1.0 |
| Emulsifier A [1] | 2.5 |
| Emulsifier C [2] | 25 |
| Dodecyl mercaptan | 1.0 |
| Water | 200 |

[1] Sodium dioctylsulfosuccinate.
[2] Sodium salt alkylated aryl polyether sulfonate.

The polymerization is carried out for 20 hours at 60° C. and a conversion of substantially 100% is obtained. Air dried films cast from ammonium hydroxide solutions of the polymer are flexible and tough.

EXAMPLE VII

Part A

An interpolymer of butadiene and methacrylic acid is prepared by an emulsion technique employing the following recipe:

| Component: | Parts |
| --- | --- |
| Butadiene | 50 |
| Methacrylic acid | 50 |
| Potassium persulfate | 1.0 |
| Emulsifier A [1] | 2.5 |
| Emulsifier C [2] | 2.5 |
| Dodecyl mercaptan | 1.0 |
| Water | 200 |

[1] Sodium dioctylsulfosuccinate.
[2] Sodium salt alkylated aryl polyether sulfonate.

The polymerization is carried out for 74 hours at 50° C. and a conversion of about 95% is obtained.

A surface coating composition is prepared by adding a stoichiometric excess of concentrated ammonium hydroxide to the latex. The addition of the ammonium hydroxide coagulates the latex, but the polymer redissolves. The composition is diluted to 15% solids by the addition of water and has a viscosity of 1600 centipoises at 20° C.

Part B

Part A is repeated except that the polymerization is stopped short of total conversion by carrying out the polymerization for only 40 hours at 50° C.

The protective coating composition prepared contains 12% solids and has a viscosity of 31 centipoises at 20° C.

EXAMPLE VIII

Glass slides are coated with the protective coating composition of Example VII, Part A, and the coatings are baked for 30 minutes at 250° F. The dry films are about 0.6 mil thick. The solvent resistance of the coatings is measured by placing two drops of solvent on the films and observing the film after 10 minutes for any softening, peeling or other deterioration. The coatings show excellent resistance to xylene, varsol and water. In each case the resistance of the coating is materially higher than a film of an unpigmented short drying oil modified alkyd resin of the same thickness.

EXAMPLE IX

Films are cast on highly polished nickel-plated steel sheets from the protective coating composition of Example VII, Part A. The coatings are cured by baking for 30 minutes at 250° F. The flexibility and adhesion of the coatings are excellent when bent over a conical mandrel as specified by ASTN text D 522–41.

The films are extremely hard and have a Sward hardness value of 65. The Sward test is used widely to evaluate the hardness of protective coatings and is described in detail at pages 164–166 of "Physical and Chemical Examination of Paints, Varnishes, Lacquers and Colors" by Henry A. Gardner and G. G. Sward, 10th Edition, May 1946, published by Henry A. Gardner Laboratory, Bethesda, Maryland. To illustrate the unusual hardness of the films, it should be noted that a coating of equal thickness prepared from a short drying oil modified alkyd resin has a Sward value of only 12.

EXAMPLE X

Example IX is repeated except that the films are baked for 20 minutes at 300° F. The flexibility and adhesion of the coatings are excellent. The coatings have a Sward hardness value of 70.

EXAMPLE XI

Example X is repeated except that 0.2% of a cobalt drier is incorporated in the protective coating composition before the films are cast therefrom. The coatings have excellent flexibility and adhesion and have a Sward hardness value of 76.

EXAMPLE XII

Examples VIII, IX, X and XI are repeated except that the protective coating composition of Example VII, Part B, is employed in lieu of the composition of Example VII, Part A. The film properties are comparable in all cases to those set forth in Examples VIII, IX, X and XI.

EXAMPLE XIII

A terpolymer of butadiene, styrene and methacrylic acid is prepared by employing the polymerization recipe of Example VI except that styrene is employed in lieu of ethyl methacrylate.

Protective coating compositions are prepared from this polymer as described in Example VII. The films cast from such protective coating compositions have good physical properties.

The protective coating compositions of this invention contain as the film former and pigment binder an aqueous solution of a salt formed between a volatile nitrogenous base and an interpolymer of a conjugated 1,3-diene and an acidic monomer of the group consisting of acrylic acid, methacrylic acid and mixtures thereof. In general, the protective coating compositions employed will contain the volatile nitrogenous base in stoichiometric excess of the carboxyl groups present in the interpolymer so that the protective coating compositions will be alkaline, i.e., have a pH of greater than 7.

In addition to the film former, the protective coating compositions may contain other components conventional to such compositions. For example, in most instances, one or more colorants will be included in the compositions. The various iron oxide pigments, the chrome pigments, the titanium dioxide pigments, the silicate pigments, etc., are particularly suitable. Antioxidants, driers and other components may also be included if desired. Such coating compositions should contain at least 10 weight percent of the salt formed between the volatile nitrogenous base and the interpolymer of the conjugated 1,3-diene and the acidic monomer. In some cases it may be desirable to employ one or more additional water-soluble film formers in conjunction with the volatile nitrogenous base salt of the interpolymer of the conjugated 1,3-diene and acidic monomer. Examples of the water-soluble film formers that may be employed for this purpose include, among others, dimethylol urea, methylol melamines, methyl ethers of the various methylol melamines, etc. With regard to protective coating compositions containing such a plurality of film forming polymers, attention is directed to the copending application of Nello Traverso, Serial No. 564,611, filed February 10, 1956.

The volatile nitrogenous bases employed in preparing salts of the interpolymers of conjugated 1,3-dienes and acidic monomers are those having atmospheric boiling points not substantially higher than about 175° C. Ammonia is the preferred volatile nitrogenous base for use in this invention, but it is also possible to employ other volatile amines such as methyl amine, dimethylamine, trimethylamine, the mono-, di- and tri-ethylamines, isopropyl amine, ethanolamine, butylamine, morpholine, pyridine, etc.

The interpolymers employed in this invention are interpolymers of a conjugated 1,3-diene and acrylic acid, methacrylic acid or a mixture of these acids. Butadiene is the conjugated 1,3-diene most frequently employed, but other conjugated 1,3-dienes such as isoprene, piperylene, 2,3-dimethyl butadiene, cyclopentadiene, etc. also may be employed. While it is frequently preferred to employ interpolymers containing only a conjugated 1,3-diene and the acidic monomer, it is possible to include in the interpolymers other interpolymerizable vinyl monomers such as vinyl mono-aromatic compounds, e.g., styrene, vinyl toluene, o-chlorostyrene, p-chlorostyrene, 2,4-dichlorostyrene, p-ethylstyrene, 2,5-dimethylstyrene alpha-methylstyrene; acrylate and methacrylate esters, e.g., methyl acrylate, ethyl acrylate, 2-ethylhexyl acrylate, methyl methacrylate; acrylamide; acrylonitrile; etc.

The proportion of the acidic monomer included in the interpolymer must be sufficient to render the interpolymer soluble in aqueous solutions of the volatile nitrogenous base employed in the protective coating compositions. The precise quantity of acidic monomer required may vary considerably and is dependent upon such factors as: (1) the comonomers included in the interpolymer and the relative proportions of the comonomers where three or more monomers are included in the interpolymer, (2) the molecular weight of the interpolymer and (3) the gel content or degree of cross-linking in the interpolymer. A minimum of approximately 15 mol percent of the acidic monomer is usually required although in some cases, as where the interpolymer has a high gel content, up to about 50 mol percent of the acidic monomer may be required. In general, the acidic monomer content should not be sufficiently high to render the interpolymer soluble in water and should never exceed more than about 70 mol percent of the interpolymer. The preferred acidic monomer content of the interpolymers is from about 15 mol percent to about 50 mol percent with optimum properties usually being obtained at an acidic monomer content of from about 20 mol percent to about 30 mol percent. The conjugated 1,3-diene should be present in the interpolymer to the extent of at least about 25 mol percent and preferably to the extent of at least about 35 mol percent to obtain the desirable properties which characterize the protective coating compositions of this invention. Good properties are obtained at conjugated 1,3-diene contents of up to about 85 mol percent. Where a third comonomer is included in the interpolymer, it may constitute up to about 60 mol percent of the interpolymer, but most frequently will constitute less than about 50 mol percent of the interpolymer. In many terpolymers of excellent properties even less than about 30 mol percent of the third comonomer is included in the interpolymer.

The interpolymer of conjugated diene and acidic monomer may be prepared by any convenient method such as by solution polymerization or emulsion polymerization. Where the interpolymer is prepared in an aqueous emulsion, the latex may be converted directly into a protective coating composition by adding thereto a stoichiometric excess of a volatile nitrogenous base. The volatile nitrogenous base may cause coagulation of the interpolymer, but thereafter the interpolymer dissolves in the nitrogenous base solution.

The protective coating compositions of this invention may be applied to the surface to be protected by any convenient technique such as brushing, dipping, rolling, spraying, etc. Such films will air-dry and have good water and solvent resistance. Optimum solvent resistance and physical properties, however, are obtained by baking the coatings at temperatures of at least 140° F. and preferably at temperatures of at least 200° F. The protective coatings prepared by the method of this invention form an excellent base for the application of other protective coatings such as alkyd resins, lacquers, varnishes, etc., and the compositions of this invention serve as excellent primers therefor.

The above descriptions and particularly the examples are set forth by way of illustration only. Many other variations and modifications thereof can be made without departing from the spirit and scope of the invention herein disclosed.

What is claimed is:

1. A method for protecting steel surfaces which comprises applying to the steel surface to be protected an aqueous solution of a salt formed between a volatile nitrogenous base and a carboxyl-group containing interpolymer and evaporating water from the film deposited on the steel surface; said carboxyl-group containing interpolymer being an interpolymer of a monomer mixture comprising in polymerized form 25–85 mol percent of a conjugated 1,3-diene of the group consisting of butadiene, isoprene, piperylene, 2,3-dimethylbutadiene, cyclopentadiene, and mixtures thereof, and 15–70 mol percent of an acidic monomer of the group consisting of acrylic acid, methacrylic acid and mixtures thereof; said volatile nitrogenous base having an atmospheric boiling point not higher than about 175° C.

2. The method of claim 1 in which the carboxyl-group containing interpolymer contains in polymerized form up to 60 mol percent of at least 1 monomer of the group consisting of styrene, vinyl toluene, o-chlorostyrene, p-chlorostyrene, 2,4-dichlorostyrene, p-ethylstyrene, 2,5-dimethylstyrene, alpha-methylstyrene, methyl acrylate, ethyl acrylate, 2-ethylhexyl acrylate, methyl methacrylate, acrylamide and acrylonitrile.

3. The method of claim 1 in which the salt employed is an ammonium salt of a binary interpolymer of monomers consisting of 85–30 mol percent of butadiene and 15–70 mol percent acrylic acid.

4. The method of claim 1 in which the salt employed is an ammonium salt of a binary interpolymer of monomers consisting of 85–30 mol percent of butadiene and 15–70 mol percent methacrylic acid.

5. The method of claim 1 in which water is evaporated from the film deposited on the steel surface by heating said film to a temperature of at least 140° F.

6. The method of claim 5 in which the temperature employed is at least 200° F.

7. In the method for protecting steel surfaces in which a primer coat of a resin is applied to a steel surface and a finish coat of an alkyd resin is applied upon said primer coat and cured; the improvement which comprises applying the primer coat to the steel surface to be protected by the method of claim 1.

References Cited in the file of this patent

UNITED STATES PATENTS

| | | |
|---|---|---|
| 2,317,725 | Billig | Apr. 27, 1943 |
| 2,604,668 | Miller et al. | July 29, 1952 |
| 2,698,239 | Alles et al. | Dec. 28, 1954 |
| 2,710,292 | Brown | June 5, 1955 |
| 2,734,831 | Larsson | Feb. 14, 1956 |
| 2,774,703 | Reynolds | Dec. 18, 1856 |
| 2,807,597 | Sonnenfeld et al. | Sept. 24, 1957 |
| 2,832,747 | Jackson | Apr. 29, 1958 |
| 2,865,877 | Hatton | Dec. 23, 1958 |

FOREIGN PATENTS

| | | |
|---|---|---|
| 371,041 | Great Britain | Apr. 14, 1932 |